United States Patent
Tveit (10) Patent No.: US 8,392,433 B2
(45) Date of Patent: Mar. 5, 2013

(54) SELF-INDEXER AND SELF INDEXING SYSTEM

(76) Inventor: Amund Tveit, Trondheim (NO)

( * ) Notice: Subject to any disclaimer, the term of this patent is extended or adjusted under 35 U.S.C. 154(b) by 0 days.

(21) Appl. No.: 13/086,571

(22) Filed: Apr. 14, 2011

(65) Prior Publication Data

US 2012/0265765 A1 Oct. 18, 2012

(51) Int. Cl.
*G06F 17/30* (2006.01)
(52) U.S. Cl. ........................ 707/748; 707/781
(58) Field of Classification Search ............. 707/748
See application file for complete search history.

(56) References Cited

U.S. PATENT DOCUMENTS

| | | | | |
|---|---|---|---|---|
| 6,311,183 B1 * | 10/2001 | Cohen | ............ | 707/747 |
| 6,795,820 B2 * | 9/2004 | Barnett | ............ | 1/1 |
| 7,058,639 B1 * | 6/2006 | Chatterjee et al. | ............ | 1/1 |
| 7,991,720 B2 * | 8/2011 | Mander et al. | ............ | 706/45 |
| 8,037,075 B2 * | 10/2011 | Millett | ............ | 707/741 |
| 2005/0149471 A1 * | 7/2005 | Lassalle | ............ | 707/1 |
| 2007/0255748 A1 * | 11/2007 | Ferragina et al. | ............ | 707/102 |
| 2007/0285958 A1 * | 12/2007 | Platchta et al. | ............ | 365/68 |

OTHER PUBLICATIONS

Roberto Grossi, et al, High-Order Entropy-compressed Text Indexes, Proceedings of the Fourteenth Annual ACM-SIKAM Symposium on Discrete Algorithms, 2003, Society for Industrial and Applied Mathematics Philadelphia, Philadelphia, PA, USA.

Nieves R. Brisaboa, et al., A New Approach for Document INdexing Using Wavelet Trees, DEXA '07 Proceedings of the 18th International Conference on Database and Expert Systems Applications, 2007, IEEE Computer Society, Washington, DC, USA.

\* cited by examiner

*Primary Examiner* — Miranda Le
(74) *Attorney, Agent, or Firm* — Catherine Napjas; Michael J. Persson; Lawson Persson & Weldon-Francke, PC (57) ABSTRACT

An improved self-indexer comprising a find function that caches a last found position and occurrence count of a symbol on each node level of a word-based wavelet tree for a particular symbol lookup and only uses a select function to call on data to the right of the position.

20 Claims, 3 Drawing Sheets

FIG. 1

RANK, SELECT, DISPLAY, COUNT, AND LOCATE FUNCTIONS 11

FIND FUNCTION 12

HASH TABLE DECODING FUNCTION 14 — UNCOMPRESSED WORDS ON LEAF NODES 16

ORDERING FUNCTION 18

ASSIGNMENT FUNCTION 20

FIG. 3

SELF-INDEXER AND SELF INDEXING SYSTEM

FIELD OF THE INVENTION

The present invention relates to self-indexing compressed texts, and in particular, to self-indexing word-based wavelet trees.

BACKGROUND

It is desirable that data storage use as little space or memory as possible. To this end, mechanisms for lossless data compression have been developed. Classic Huffman coding, for example, refers to the use of a variable-length code table for encoding a source symbol (such as a character in a file) where the variable-length code table has been derived in a particular way based on the estimated probability of occurrence for each possible value of the source symbol. Huffman coding was advanced by wavelet trees, as described in Grossi, Roberto, et al., HIGH-ORDER ENTROPY-COMPRESSED TEXT INDEXES, *Proceedings of the Fourteenth Annual ACM-SIAM Symposium on Discrete Algorithms*, 2003. A wavelet tree, as described by Grossi et al., is a data structure that uses character level compression, like Huffman coding, to represent data in a compressed and tree-based data structure that enables searching. Such wavelet trees were again advanced by word-based wavelet trees, which encode words instead of characters in the tree, as described in Brisaboa, Nieves R., et al., A NEW APPROACH FOR DOCUMENT INDEXING USING WAVELET TREES, 2007. The teachings of this article are hereby incorporated by reference.

Word-based wavelet trees operate as follows. The frequency of words or phrases is counted. Each word is assigned a byte string according to its frequency. The most common words are replaced with the shortest byte string, i.e. a single byte. Less common words are replaced with longer byte strings, i.e. 2 or more bytes. Additionally, each byte string uses end tagged dense code (ETDC), which is a compression method that assigns byte codes to words, where the last byte of each byte code is used as an "end tag" by marking its first bit to "1." The use of ETDC makes random access in compressed byte strings possible. This is as opposed to bit based Huffman coding where random access is not possible because it is unknown where the encoded characters start and stop.

Although word-based wavelet trees are an improvement over the prior art, their indexing is still not optimally efficient. Current self-indexers include only the basic rank, select, display, locate, and count functions described in Brisaboa, et al. Therefore there is a need for a word-based wavelet tree self-indexer that optimizes the indexing of word-based wavelet trees by including functions beyond these basic functions.

SUMMARY OF THE INVENTION

The present invention includes a self-indexer, a self-indexing system, and a self-indexing method.

The self-indexer of the present invention is used to index a data collection made up of many documents. As used herein, "documents" may refer to any set of data, such as a word document, a word, a phrase, a symbol, a binary string, a multimedia stream, an audio file, etc... The self-indexer may index anything, but requires a dictionary that maps from the document to the ETDC in the data collection. The data collection is represented in a compressed format by a word-based wavelet tree, as described above.

In its most basic form, the self-indexer of the present invention includes standard rank, select, display, locate, and count functions, and a find function. Using current wavelet tree search methods, a large set of results (e.g. 100-100,000 results) are returned for the given query terms, and these results are ranked, with only the top n results displayed, where n is a pre-designated number. This requires repeated calls to use the locate function for the same term to find many, or all, occurrences of it. The select function is heavily used in methods using the locate function, e.g. for finding the position in the original string for the n'th occurrence of a symbol. When searching for repeated occurrences of a symbol, the select function duplicates work, as it requires working on the entire byte string on repeated calls to use the select function on the same tree node. Such superfluous work reduces performance.

A better approach is used by the find function of the self-indexer of the present invention. This approach involves starting from the position on the byte string where the last occurrence was found. The find function caches the last found position and occurrence count of a symbol, such as a phrase, word, or character, on each node level of the wavelet tree for a particular symbol lookup and only uses the select function to call on data to the right of that position. In this manner, each subsequent use of the select function to call will be required to cover less and less data, as opposed to re-selecting over the entire data each time. The cache is stored in a hash table with the pointer value of the node, i.e. the numerical memory address, as the key.

A preferred embodiment of the self-indexer of the present invention also includes a hash table decoding function for decoding a document from the word-based wavelet tree back to its original representation. A hash table is a data structure that uses a hash function to map identifying values, or "keys," to their associated "values." Decoding a document uses the rank function heavily. When the rank function is called on one node, the next time the decoding function navigates to the same node for the next word in the document, the previous rank value should be incremented by one with no need to call on the rank function again.

The hash table decoding function of the present invention uses a hash table with a key of the pointer value of a node, which is the numerical memory address, and a corresponding value of the integer provided by the rank function, at that pointer value, hereinafter referred to as the "rank." Each time a node is traversed for decoding, the hash table is consulted. If the traversed node is indicated in the key of the hash table, then the rank in the corresponding value of the hash table is increased by one. If the traversed node is not indicated in the key of the hash table, then a new entry in the key is created for that pointer value of the traversed node and the rank at that pointer value is calculated and stored in the value of the hash table corresponding to the new entry in the key of the hash table. Uncompressed words or phrases may be stored directly on leaf nodes, which are nodes that have no child nodes. This gives a slight storage penalty compared to looking them up in the dictionary with the compressed code gotten by traversing, but improves performance in the form of reducing decoding latency.

A preferred embodiment of the self-indexer of the present invention also includes an ordering function for ranking documents within the index. The most common ranking algorithm in information retrieval is TF*IDF. TF is the term frequency, which is how many times a term, e.g. a word, appears in a document. IDF is the inverse document frequency, which is how many documents a term appears in within the whole data collection. TF*IDF is then summed for each document that is to be ranked.

The ordering function of the present invention, on the other hand, uses what the inventor calls an "and-search" function. And-search looks to the presence of all query terms in all result documents that are of most interest to rank. Ranking using and-search is performed in the following way: Query terms are sorted by occurrence in the entire data collection. Query terms include a rarest query term, which is the query term with the lowest occurrence in the data collection, and one or more non-rarest query terms. The rarest query term is then counted with TF. A complete search for documents containing the rarest query term is then performed. For each document in which a rarest query term occurs, a fast, probabilistic check is performed on the document to check for the non-rarest query terms. A probabilistic search is a search performed with a certain probability of error. Because a probabilistic search is not a complete search, it is faster than a complete search. The error parameters may be set so that the search has varying levels of likelihood of accuracy. If the presence of the non-rarest query terms is unlikely, then that document is skipped and the next document goes through the probabilistic check. If the presence of the non-rarest query terms is likely, then an actual check for the non-rarest query terms is performed, but only the first occurrence of each is found.

The and-search method of the ordering function means that only the rarest query term gets a correct TF count. The non-rarest query terms get underestimated TF counts. The rarest query term is likely to have the highest information value in the query, i.e. frequent words are usually stopwords. As the query terms are sorted for occurrence in the data collection, and the rarest query term has highest weight, multiplication with the IDF, as in the standard method of ranking described above, is skipped. The ranking score with the ordering function of the present invention therefore becomes ranking score=sum(estimated TF counts for each query term). This gives a fast ranking approximation that does not require many iterations.

A preferred embodiment of the self-indexer of the present invention also includes an assignment function for assigning ETDCs. The optimally compressed wavelet index with ETDCs assigns the most frequent word the shortest ETDC and the least frequent word the longest ETDC code. Such assignment requires knowledge of all terms in advance, which is not practical because while indexing incoming documents, new and unseen words might arrive.

The assignment function of the present invention assigns the next available ETDC, regardless of the ETDC's length, to a previously unseen word. The assignment function does not give optimal compression, as a previously unseen word may be assigned a long ETDC and the word may end up being very frequently used. The assignment function does facilitate the indexing function, however, and in practice, the compression functions well if the data collection is seeded with an initial set of documents before turning on the incremental ETDC creation and indexing of the assignment function. This is because many high frequency terms will have occurred in the seed documents and will have already been assigned short ETDCs.

In its most basic form, the self-indexing system of the present invention includes the self-indexer of the present invention and a data collection.

In a preferred embodiment of the self-indexing system of the present invention, the self-indexing system also includes a stopword index and the self-indexer also includes a stopword efficiency function for efficiently dealing with stopwords. Stopwords are words of very high frequency, e.g. "is," "are," "the" in the English language. Stopwords take up a lot of room in data collections without adding much information. The stopword efficiency function of the present invention assigns a common, short ETDC for each stopword. The ETDC may be a single byte, for example. Whenever this ETDC appears, the stopword can be found in the separate stopword index—an index which only has stopwords and separate ETDCs, and the order of the stopwords is preserved from the original data collection. If the sentence, "This is a fish," is indexed, for example, the words "this," "is," and "a" are stopwords, that would be stored in the separate stopword index. The separate stopword index may be stored on a less expensive medium than the data collection full of non-stopwords. Phrases containing stopwords only, such as "to be or not to be," may be looked up directly in the stopword index.

In some embodiments of the stopword efficiency function, bigrams containing only stopwords are also assigned ETDCs and stored in the stopword index. The bigram "to be," for example, would be assigned an ETDC, rather than each of the stopwords "to" and "be" being assigned an ETDC. Queries could then be converted to queries for bigrams. The advantage of this bigram indexing is that stopwords that contain little information themselves will not be assigned the shortest ETDCs because the bigrams will occur less frequently than the stopwords separately. The bigrams will be assigned longer ETDCs based on their lower frequency, and will give fewer results. To find the phrase "to be or not to be," when broken into the stopwords "to," "be," "not," and "or," for example, may not be manageable on a large data collection. Condensing the terms into "to be," "not," and "or," however, may be.

In a preferred embodiment of the self-indexing system of the present invention, the self-indexing system also includes a data array and the self-indexer also includes a URI efficiency function for efficiently dealing with URIs for documents. A wavelet tree has no representation of documents in itself—it is merely an index of sequences of words. The URI efficiency function of the present invention uses the separate data array that supports documents with URI addresses. This data array includes a number of elements, each corresponding to a document in the data collection, and each including a start position of the document in the data collection, the document length, and the URI for the document. The number of elements in the data array therefore corresponds to the total number of documents in the data collection with URI addresses. The array is sorted on start position. The self-indexer command "findUriForTermOccurence," at a position in the wavelet tree accesses the start position in the data array with the URI address, thus correlating a document in the wavelet tree with its URI.

In a preferred embodiment of the self-indexing system of the present invention, the data collection includes multiple fields and sub-indices for each field and the self-indexer also includes a multiple field function for efficiently dealing with multiple fields. An example of multiple fields is one title field and one content field, both of which should be indexed. The multiple field function of the present invention assigns ETDCs to field types. If a field is called "person names," for example, and a person name is found, the value is replaced with the ETDC and stored in a sub-index for that field type.

Finally, a preferred embodiment of the self-indexing system of the present invention also includes a persistence function for facilitating persistent storage of the word-based wavelet tree. This is achieved by using a regular directory structure with a standard encoding, such as base64,e.g. encoded_term_prefix, or hex_values, e.g. encoded_term_ prefix, as the path. The preferred wavelet tree has a 128-tree, so the directory structure should have a maximum 128 directories per directory, as well as one or a few data files.

The following provides an example of some of the functions of a preferred self-indexer of the present invention. For storing, assume the terms "windows" and "cloud" are encoded as [0x39,0xa1,0xb7] and [0x39,0xa1,0x44], respectively. With the common prefix [0x39,0xa1], the directory structure may be index/0x39/0xa1/node.dat, with node.dat containing '0xb7,x44'. This may be stored as json, avro, thrift, or protocolbuffer for easy retrieval back. Storing in free text is likely to not be a penalty as seeking plus reading from HDD or SSD takes relatively much more time than updating the node data structure. This is a debugging advantage, and makes it easier to auto-generate a wavelet tree with any type of scripting language, for example.

For retrieval, assume a search for "cloud." First, the encoding for "cloud" is looked up in a dictionary, returning the result [0x39,0xa1,0x44]. Then the file 'index/0x39/0xa1/node.dat' is fetched/decoded into memory as a node. This may be stored in membase, memcache, or redis to have some kind of caching. Intermediate files, e.g. 'index/node.dat', 'index/0x39/node.dat' may need to be fetched in order to support searching. The higher up, the more likely they are to be in memory. With this approach one could start with an empty tree and just have a training set of query logs to run through. Finally, 0x44 is searched for in the node, or the last byte in the encoding of "cloud" from there, and propagated.

For an example of estimated latency on SSD and HDD: The further down in the wavelet, the smaller the data files are. There is also a need to fetch files along the path, e.g. 'index/0x39/node.dat' and 'index/0x39/0xa1/node.dat,' as described above, in order to support searching. The time needed for this, assuming it is IO bounded, is practically seek-time bounded, or possibly faster due to OS directory handling. This may result in real times of 5,000-15,000 µs on a regular hard drive and 10-100 µs on an SSD. This is an easy structure to maintain, as it is incremental only through an append function, and will work well on smartphones with property files. To summarize, per query on SSD, the latency would be:

|num query terms|*|average(query encoding length)|*
(10 to 100 µs).

For example, 4*3*(10 to 100 µs)=120 to 1200 µs, or 0.12 to 1.2 ms for a 4-keyword query.

The self-indexing method of the present invention includes step of accessing the data collection represented by the word-based wavelet tree and steps for performing each of the functions of the self-indexer and self-indexing system of the present invention, as described above.

Specifically, the find function includes the step of searching the word-based wavelet tree. This searching step includes the steps of caching a last found position and occurrence count of a symbol on each node level of the word-based wavelet tree for a particular symbol lookup and using a select function to call only on data to the right of the last found position.

The hash table decoding function includes the step of decoding a document from the word-based wavelet tree back into its original representation. The decoding step includes the steps of creating a hash table with the key of the hash table being a pointer value of a node and the corresponding value of the hash table being the rank at that pointer value; traversing a node for decoding; consulting the hash table each time a node is traversed; increasing the rank in the corresponding value of the hash table if the traversed node is indicated in the key of the hash table; creating a new entry in the key of the hash table for a pointer value of the traversed node if the traversed node is not indicated in the key of the hash table; and calculating and storing a rank of the pointer value in the value of the hash table corresponding to the new entry in the key of said hash table if the traversed node is not indicated in the key of the hash table.

Having uncompressed words on leaf nodes includes the step of storing uncompressed words on leaf nodes of the wavelet tree.

The ordering function includes the step of ranking documents within the data collection. This ranking step includes the steps of sorting query terms by occurrence within the data collection, where query terms include a rarest query term and at least one non-rarest query term; counting the rarest query term with term frequency; searching for documents including the rarest query term; performing a probabilistic check for the non-rarest query terms when a document including the rarest query term is found; searching for a first occurrence of each non-rarest query term if the probabilistic check indicates a likelihood of a presence of the non-rarest query terms; and performing a probabilistic check for the non-rarest query terms on the next document including the rarest query term if the probabilistic check does not indicate a likelihood of a presence of the non-rarest query terms.

The assignment function includes the step of assigning a next available ETDC from an ordered list of ETDCs to a previously unseen word.

The stopword efficiency function includes the step of separating stopwords from the data collection. The separating stopwords step includes the steps of assigning an ETDC to each stopword; storing the ETDCs assigned to each stopword and the stopwords in a stopword index distinct from the data collection; indexing the stopword index; and preserving the order of the stopwords in the stopword index. The bigram efficiency function adds to these steps by also including the steps of assigning ETDCs to bigrams comprised of stopwords; and storing the ETDCs assigned to each bigram and the bigrams in the stopword index.

The URI efficiency function includes the step of organizing documents with URI addresses. Organizing step includes the steps of indexing a data array, where the data array includes at least one element, each element corresponds to a document within the data collection with a URI address, and each element includes the start position of the document within the data collection, the length of the document, and the URI of the document; sorting the data array based on the start positions of each of the at least one element; executing a URI efficiency function at a position in the word-based wavelet tree; and providing access to the element of the data array that corresponds to the position in the word-based wavelet tree upon performing the executing step.

The multiple field function includes the step of providing multiple fields. The providing multiple fields step includes the steps of assigning an ETDC to each field type of the data collection; creating a sub-index for each field type; replacing a value corresponding to a field type with the ETDC assigned to the field type in the assigning step when the value corresponds to a field type; and storing the ETDC in the sub-index for the field type.

The persistence function includes the step of storing the word-based wavelet tree persistently by using a directory structure with an encoding as a path.

Therefore it is an aspect of the present invention to provide a self-indexer with a function for efficiently finding several or all occurrences of a symbol.

It is a further aspect of the present invention to provide a self-indexer with a function for efficiently decoding a document from a wavelet tree back to its original representation.

It is a further aspect of the present invention to provide a self-indexer with a function for efficiently ranking search results.

It is a further aspect of the present invention to provide a self-indexing system with a function for supporting incrementally indexing documents without knowing all symbol types in advance.

It is a further aspect of the present invention to provide a self-indexing system with a function for efficiently dealing with stopwords.

It is a further aspect of the present invention to provide a self-indexing system with a function for efficiently dealing with URIs for documents.

It is a further aspect of the present invention to provide a self-indexing system with a function for efficiently dealing with multiple fields.

It is a further aspect of the present invention to provide a self-indexing system with a function for efficiently persisting the data structure.

It is a further aspect of the present invention to provide a self-indexing method including steps for performing the functions of the self-indexer and self-indexing system of the present invention.

These aspects of the present invention are not meant to be exclusive and other features, aspects, and advantages of the present invention will be readily apparent to those of ordinary skill in the art when read in conjunction with the following description and accompanying drawings.

DETAILED DESCRIPTION

Figure 1:
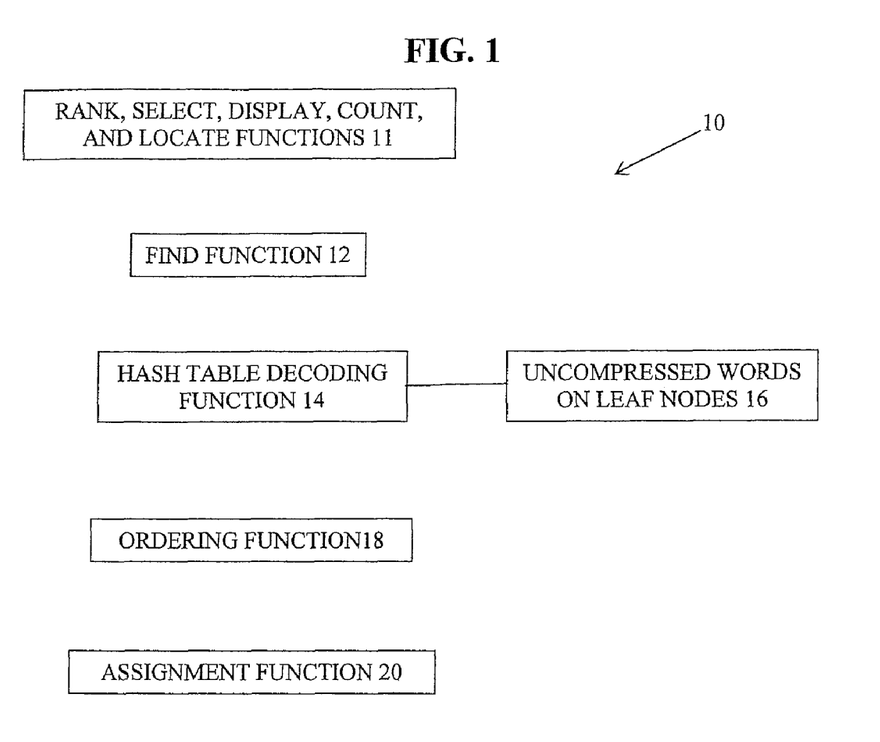
FIG. 1 is a block diagram showing the functions of the self-indexer of the present invention.

Referring to FIG. 1, the functions of self-indexer 10 of the present invention are shown.

Self-indexer 10 includes rank, select, display, count, and locate functions 11; find function 12; hash table decoding function 14, including having uncompressed words on leaf nodes 16; ordering function 18; and assignment function 20.

Rank, select, display, count, and locate functions 11 are standard self-indexer functions, as described in Brisaboa, et al.

Find function 12 involves starting from the position on the byte string where the last occurrence of a symbol was found. Find function 12 caches the last found position and occurrence count of a symbol, such as a phrase, word, or character, on each node level of the wavelet tree for a particular symbol lookup and only uses the select function to call on data to the right of that position. In this manner, each subsequent use of the select function to call will be required to cover less and less data, as opposed to re-selecting over the entire data each time.

Hash table decoding function 14 uses a hash table with a key of the pointer value of a node, which is the numerical memory address, and a corresponding value of the integer provided by the rank function, at that pointer value. Each time a node is traversed for decoding, the hash table is consulted. If the traversed node is indicated in the key of the hash table, then the rank in the corresponding value of the hash table is increased by one. If the traversed node is not indicated in the key of the hash table, then a new entry in the key is created for that pointer value of the traversed node and the rank at that pointer value is calculated and stored in the value of the hash table corresponding to the new entry in the key of the hash table. Uncompressed words or phrases may be stored directly on leaf nodes 16.

Ordering function 18 uses "and-search." And-search looks to the presence of all query terms in all result documents that are of most interest to rank. Ranking using and-search is performed in the following way: Query terms are sorted by occurrence in the entire data collection. Query terms include a rarest query term, which is the query term with the lowest occurrence in the data collection, and one or more non-rarest query terms. The rarest query term is then counted with TF. A search for documents containing the rarest query term is then performed. For each document in which a rarest query term occurs, a fast, probabilistic check is performed on the document to check for the non-rarest query terms. If the presence of the non-rarest query terms is unlikely, then that document is skipped and the next document goes through the probabilistic check. If the presence of the non-rarest query terms is likely, then an actual check for the non-rarest query terms is performed, but only the first occurrence of each is found.

Assignment function 20 assigns the next available ETDC, regardless of the ETDC's length, to a previously unseen word.

Figure 2:
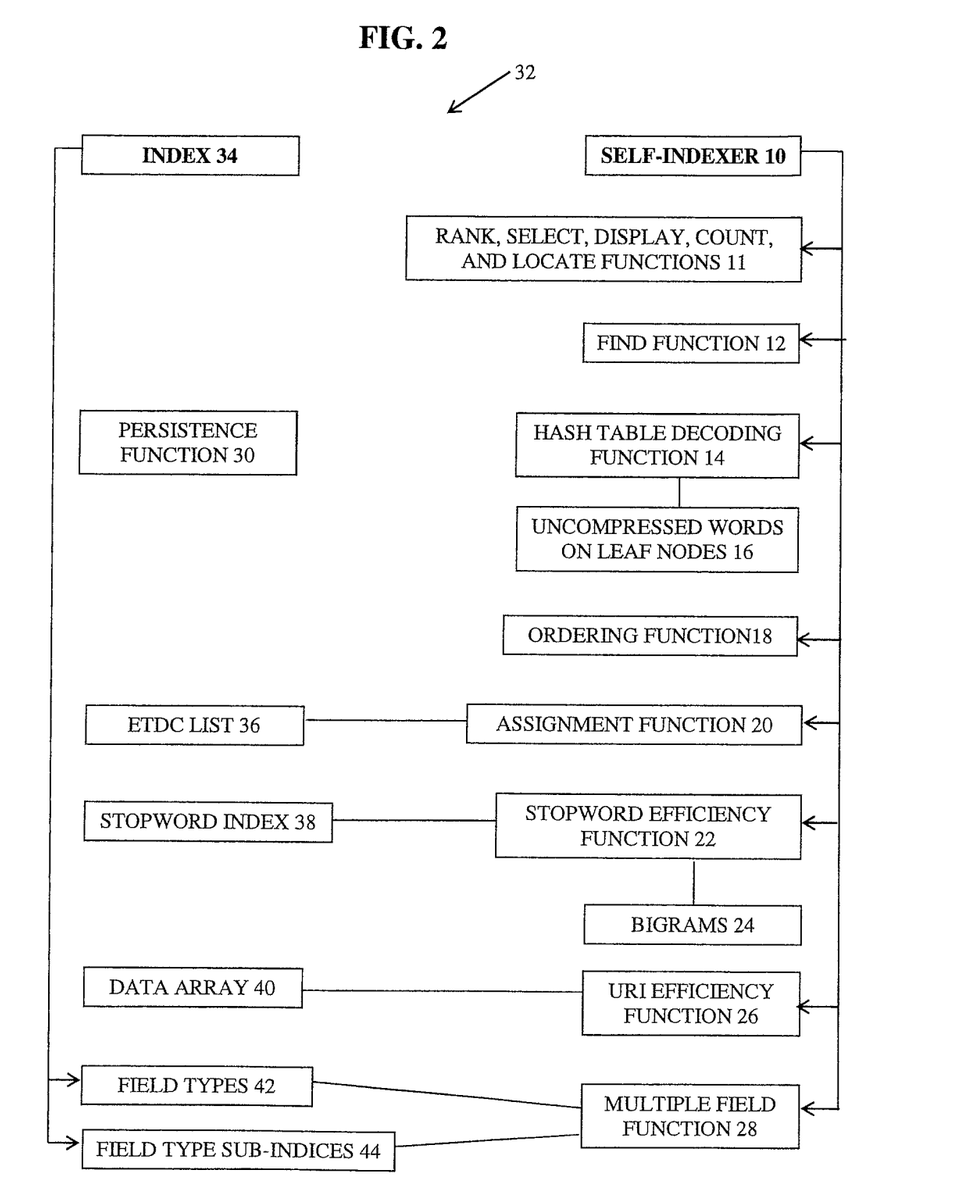
FIG. 2 is a block diagram showing the functions of the self-indexing system of the present invention.

Now referring to FIG. 2, the features of self-indexing system 32 are shown. Self-indexing system 32 includes data collection 34 with field types 42 and field type indices 44, ETDC list 36, stopword index 38, data array 40, self-indexer 10 with the following functions: select, display, count, and locate functions 11; find function 12; hash table decoding function 14, including having uncompressed words on leaf nodes 16; ordering function 18; assignment function 20; stopword efficiency function 22, including bigram 24 efficiency; URI efficiency function 26; and multiple field function 28, and persistence function 30.

The following functions of self-indexer 10 are as described above: select, display, count, and locate functions 11; find function 12; hash table decoding function 14, including having uncompressed words on leaf nodes 16; ordering function 18; and assignment function 20. In self-indexing system 32, ETDC list 36, used in assignment function 20, is part of self-indexing system 32. A line is shown between ETDC list 36 and assignment function 20 to indicate that ETDC list 36 is used in assignment function 20.

Self-indexing system 32 includes stopword index 38 for use with stopword efficiency function 22 of self-indexer 10. A line is shown between stopword index 38 and stopword efficiency function 22 to indicate that stopword index 38 is used in stopword efficiency function 22. Stopword efficiency function 22 assigns a common, short ETDC for each stopword. The ETDC may be a single byte, for example. Whenever this ETDC appears, the stopword can be found in separate stopword index 38—an index which only has stopwords and separate ETDCs, and the order of the stopwords is preserved from the original data collection. Bigrams 24, including two stopwords, are also assigned an ETDC and stored in stopword index 38.

Self-indexing system 32 includes data array 40 for use with URI efficiency function 26 of self-indexer 10. A line is shown between data array 40 and URI efficiency function 26 to indicate that data array 40 is used in URI efficiency function 26. URI efficiency function 26 uses separate data array 40 that supports documents with URI addresses. Data array 40 includes a number of elements, each corresponding to a document in data collection 34, and each including a start position of the document in data collection 34, the document length, and the URI for the document. The number of elements in data array 40 therefore corresponds to the total number of documents in data collection 34 with URI addresses. Data array 40 is sorted on start position. The self-indexer command "findUriForTermOccurence," at a position in the wavelet tree accesses the start position in data array 40 with the URI address, thus correlating a document in the wavelet tree with its URI.

In self-indexing system 32, index 34 includes field types 42 and field type sub-indices 44. This is indicated by an arrow pointing from index 34 to field types 42 and field type sub-indices 44. A line is shown between field types 42/field type sub-indices 44 and multiple field function 28 to indicate that field types 42/field type sub-indices 44 are used in multiple field function 28.

Multiple field function 28 assigns ETDCs to field types 42. If a field is called "person names," for example, and a person name is found, the value is replaced with the ETDC and stored in a sub-index 44 for that field type.

Self-indexing system 32 also includes persistence function 30. Persistence function 30 facilitates persistent storage of the word-based wavelet tree. This is achieved by using a regular directory structure with a standard encoding, such as base64, e.g. encoded_term_prefix, or hex_values, e.g. encoded_term_prefix, as the path. The preferred wavelet tree has a 128-tree, so the directory structure should have a maximum 128 directories per directory, as well as one or a few data files.

Figure 3:
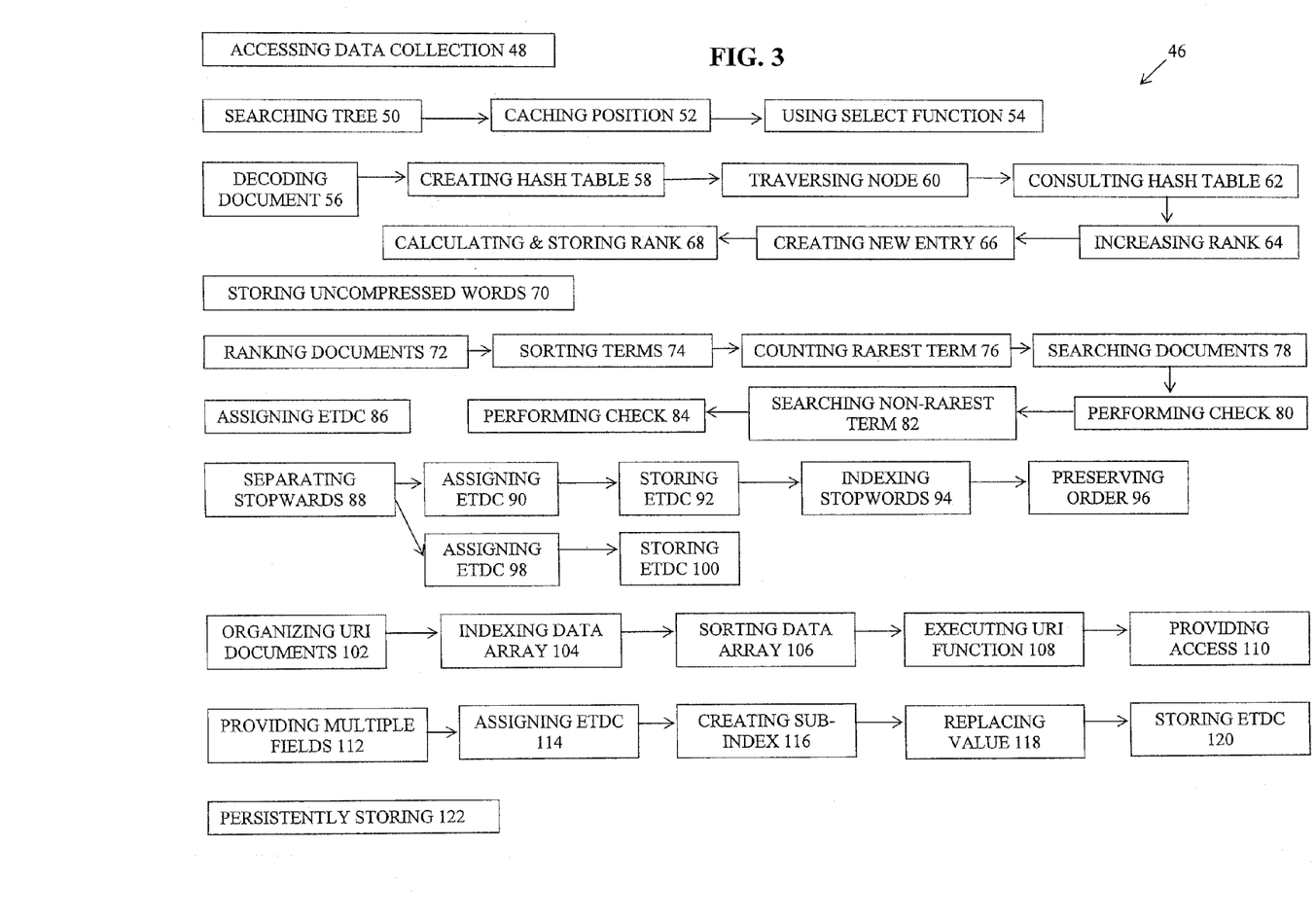
FIG. 3 is a block diagram showing the steps of the self-indexing method of the present invention.

Self-indexing method 46, includes steps for accessing the data collection 48 represented by the word-based wavelet tree and steps for performing all of the following functions of self-indexer 10 and self-indexing system 32 as described above: find function 12; hash table decoding function 14, including having uncompressed words on leaf nodes 16; ordering function 18; assignment function 20; stopword efficiency function 22, including bigram 24 efficiency; URI efficiency function 26; multiple field function 28; and persistence function 30.

Specifically, find function 12 includes the step of searching the word-based wavelet tree 50. Searching step 50 includes the steps of caching a last found position and occurrence count 52 of a symbol on each node level of the word-based wavelet tree for a particular symbol lookup and using a select function 54 to call only on data to the right of the last found position.

Hash table decoding function 14 includes the step of decoding a document 56 from the word-based wavelet tree back into its original representation. Decoding step 56 includes the steps of creating a hash table 58 with the key of the hash table being a pointer value of a node and the corresponding value of the hash table being the rank at that pointer value; traversing a node 60 for decoding; consulting the hash table 62 each time a node is traversed; increasing the rank 64 in the corresponding value of the hash table if the traversed node is indicated in the key of the hash table; creating a new entry 66 in the key of the hash table for a pointer value of the traversed node if the traversed node is not indicated in the key of the hash table; and calculating and storing a rank 68 of the pointer value in the value of the hash table corresponding to the new entry in the key of said hash table if the traversed node is not indicated in the key of the hash table.

Having uncompressed words on leaf nodes 16 includes the step of storing uncompressed words 70 on leaf nodes of the wavelet tree.

Ordering function 18 includes the step of ranking documents 72 within the data collection. Ranking step 72 includes the steps of sorting query terms 74 by occurrence within the data collection, where query terms include a rarest query term and at least one non-rarest query term; counting the rarest query term 76 with term frequency; searching for documents 78 including the rarest query term; performing a probabilistic check 80 for the non-rarest query terms when a document including the rarest query term is found; searching for a first occurrence of each non-rarest query term 82 if the probabilistic check indicates a likelihood of a presence of the non-rarest query terms; and performing a probabilistic check 84 for the non-rarest query terms on the next document including the rarest query term if the probabilistic check does not indicate a likelihood of a presence of the non-rarest query terms.

Assignment function 20 includes the step of assigning a next available ETDC 86 from an ordered list of ETDCs to a previously unseen word.

Stopword efficiency function 22 includes the step of separating stopwords 88 from the data collection. Separating stopwords step 88 includes the steps of assigning an ETDC 90 to each stopword; storing the ETDCs 92 assigned to each stopword and the stopwords in a stopword index distinct from the data collection; indexing the stopword index 94; and preserving the order 96 of the stopwords in the stopword index. Bigram efficiency function 24 adds to these steps by also including the steps of assigning ETDCs 98 to bigrams comprised of stopwords; and storing 100 the ETDCs assigned to each bigram and the bigrams in the stopword index.

URI efficiency function 26 includes the step of organizing documents with URI addresses 102. Organizing step 102 includes the steps of indexing a data array 104, where the data array includes at least one element, each element corresponds to a document within the data collection with a URI address, and each element includes the start position of the document within the data collection, the length of the document, and the URI of the document; sorting the data array 106 based on the start positions of each of the at least one element; executing a URI efficiency function 108 at a position in the word-based wavelet tree; and providing access 110 to the element of the data array that corresponds to the position in the word-based wavelet tree upon performing executing step 108.

Multiple field function 28 includes the step of providing multiple fields 112. Providing step 112 includes the steps of assigning an ETDC 114 to each field type of the data collection; creating a sub-index 116 for each field type; replacing a value 118 corresponding to a field type with the ETDC assigned to the field type in assigning step 114 when the value corresponds to a field type; and storing the ETDC 120 in the sub-index for the field type.

Persistence function 30 includes the step of storing the word-based wavelet tree persistently 122 by using a directory structure with an encoding as a path.

Although the present invention has been described in considerable detail with reference to certain preferred versions thereof, other versions would be readily apparent to those of ordinary skill in the art. Therefore, the spirit and scope of the description should not be limited to the description of the preferred versions contained herein.

I claim:

1. A self-indexing software product comprising a non-transitory computer-readable medium in which program instructions are stored, which instructions, when read by a computer, cause the computer to index a data collection comprising a plurality of documents wherein the data collection is represented by a word-based wavelet tree comprising a plurality of nodes and node levels, and to further index a data array comprising at least one element, wherein each of the at least one element corresponds to a document within the data collection with a uniform resource identifier (URI) address, wherein said self-indexing software product comprises:

rank function software code for returning a number of occurrences of a symbol within a sequence of symbols in the word-based wavelet tree;

select function software code for returning a position of the jth occurrence of a symbol within a sequence of symbols in the word-based wavelet tree;

display function software code for returning a symbol at a position in the word-based wavelet tree;

count function software code for returning a number a of occurrences of a symbol in the word-based wavelet tree;

locate function software code for returning a position of an occurrence of a symbol in the word-based wavelet tree;

find function software code for caching a last found position and occurrence count of a symbol on each node level of the word-based wavelet tree for a particular symbol lookup and using said select function software code to call only on data to the right of the last found position;

URI efficiency function software code:
wherein each of the at least one element comprises a start position of the document within the data collection, a length of the document, and a URI of the document;
wherein the data array is sorted based on the start positions of each of the at least one element; and
wherein execution of said URI efficiency function software code at a position in the word-based wavelet tree provides access to the at least one element of the data array that corresponds to the position in the word-based wavelet tree at execution; and hash table decoding function software code for decoding a document from the word-based wavelet tree back into its original representation, said hash table decoding function software code comprising a hash table:
wherein a key of said hash table is a pointer value of a node and a corresponding value of said hash table is a rank at the pointer value;
wherein each time a node is traversed for decoding, said hash table is consulted;
wherein if the traversed node is indicated in the key of said hash table, then the rank in the corresponding value of said hash table is increased by one; and
wherein if the traversed node is not indicated in the key of said hash table, then a new entry in the key of said hash table is created for a pointer value of the traversed node and the rank at the pointer value is calculated and stored in the value of said hash table corresponding to said new entry in the key of said hash table.

2. The self-indexing software product as claimed in claim 1, wherein uncompressed words are stored on leaf nodes of the word-based wavelet tree.

3. The self-indexing software product as claimed in claim 1, further comprising ordering function software code for ranking documents within the data collection:
wherein query terms comprising a rarest query term and at least one non-rarest query term are sorted by occurrence within the data collection;
wherein the rarest query term is counted with term frequency;
wherein documents including the rarest query term are searched for; and
wherein when a document including the rarest query term is found, a probabilistic check for the non-rarest query terms is performed;
wherein if the probabilistic check indicates a likelihood of a presence of the non-rarest query terms, then a first occurrence of each non-rarest query term is searched for; and
wherein if the probabilistic check does not indicate a likelihood of a presence of the non-rarest query terms, then a probabilistic check for the non-rarest query terms is performed on a next document including the rarest query term.

4. The self-indexing software product as claimed in claim 1, further comprising an ordered list of end tagged dense codes (ETDCs) and assignment function software code for assigning a next available ETDC from said ordered list to a previously unseen word.

5. A self-indexing system stored on a non-transitory computer-readable medium and executable by a computer comprising:
a computer;
a data collection comprising a plurality of documents stored on said non-transitory computer-readable medium;
a data array comprising at least one element, wherein each of said at least one element corresponds to a document within said data collection with a uniform resource identifier (URI) address; and
a self-indexing software product comprising a non-transitory computer-readable medium in which program instructions are stored, which instructions, when read by a computer, cause the computer to index said data collection and said data array, wherein said data collection is represented by a word-based wavelet tree comprising a plurality of nodes and node levels, and wherein said self-indexing software product comprises:
rank function software code for returning a number of occurrences of a symbol within a sequence of symbols in the word-based wavelet tree;
select function software code for returning a position of the jth occurrence of a symbol within a sequence of symbols in the word-based wavelet tree;
display function software code for returning a symbol at a position in the word-based wavelet tree;
count function software code for returning a number a of occurrences of a symbol in the word-based wavelet tree;
locate function software code for returning a position of an occurrence of a symbol in the word-based wavelet tree;
find function software code for caching a last found position and occurrence count of a symbol on each node level of the word-based wavelet tree for a particular symbol lookup and using said select function software code to call only on data to the right of the last found position;
URI efficiency function software code:
wherein each of the at least one element comprises a start position of the document within said data collection, a length of the document, and a URI of the document;
wherein said data array is sorted based on the start positions of each of said at least one element; and
wherein execution of said URI efficiency function software code at a position in the word-based wavelet tree provides access to said at least one element of said data array that corresponds to the position in the word-based wavelet tree at execution; and
hash table decoding function software code for decoding a document from the word-based wavelet tree back into its original representation, said hash table decoding function software code comprising a hash table:
wherein a key of said hash table is a pointer value of a node and a corresponding value of said hash table is a rank at the pointer value;
wherein each time a node is traversed for decoding, said hash table is consulted;
wherein if the traversed node is indicated in the key of said hash table, then the rank in the corresponding value of said hash table is increased by one; and
wherein if the traversed node is not indicated in the key of said hash table, then a new entry in the key of said hash table is created for a pointer value of the traversed node and the rank at the pointer value is calculated and stored in the value of said hash table corresponding to said new entry in the key of said hash table.

6. The self-indexing system as claimed in claim 5, wherein uncompressed words are stored on leaf nodes of the wavelet tree.

7. The self-indexing system as claimed in claim 5, wherein said self-indexing software product further comprises ordering function software code for ranking documents within said data collection:
wherein query terms comprising a rarest query term and at least one non-rarest query term are sorted by occurrence within said data collection;
wherein the rarest query term is counted with term frequency;
wherein documents including the rarest query term are searched for; and
wherein when a document including the rarest query term is found, a probabilistic check for the non-rarest query terms is performed;
wherein if the probabilistic check indicates a likelihood of a presence of the non-rarest query terms, then a first occurrence of each non-rarest query term is searched for; and
wherein if the probabilistic check does not indicate a likelihood of a presence of the non-rarest query terms, then a probabilistic check for the non-rarest query terms is performed on a next document including the rarest query term.

8. The self-indexing system as claimed in claim 5:
wherein said self-indexing system further comprises an ordered list of end tagged dense codes (ETDCs); and
wherein said self-indexing software product further comprises assignment function software code software code for assigning a next available ETDC from said ordered list to a previously unseen word.

9. The self-indexing system as claimed in claim 5:
wherein said self-indexing system further comprises a stopword index distinct from said data collection;
wherein said self-indexing software product further indexes said stopword index; and
wherein said self-indexing software product further comprises stopword efficiency function software code:
wherein an end tagged dense code (ETDC) is assigned to each stopword;
wherein the ETDCs assigned to each stopword and the stopwords are stored in said stopword index; and
wherein an order of the stopwords is preserved in said stopword index.

10. The self-indexing system as claimed in claim 9, wherein said stopword efficiency function software code further operates such that ETDCs are further assigned to bigrams comprised of stopwords and the ETDCs assigned to each bigram and the bigrams are stored in said stopword index.

11. The self-indexing system as claimed in claim 5:
wherein said data collection comprises a plurality of field types and a sub-index for each field type; and
wherein said self-indexing software product further comprises multiple field function software code:
wherein an end tagged dense code (ETDC) is assigned to each of said field types of said data collection; and
wherein when a value corresponds to one of said field types, the value is replaced by the ETDC assigned to said field type and stored in said sub-index for said field type.

12. The self-indexing system as claimed in claim 5, further comprising a persistence function software product for achieving persistent storage of the word-based wavelet tree using a directory structure with an encoding as a path.

13. A method for self-indexing a data collection comprising a plurality of documents, said method comprising the steps of:
accessing the data collection, wherein the data collection is represented by a word-based wavelet tree comprising a plurality of nodes;
searching the word-based wavelet tree, said searching step comprising the steps of:
caching a last found position and occurrence count of a symbol on each node level of the word-based wavelet tree for a particular symbol lookup; and
using a select function to call only on data to the right of the last found position;
organizing documents with uniform resource identifier (URI) addresses, said organizing step comprising the steps of:
indexing a data array comprising at least one element, wherein each of the at least one element corresponds to a document within the data collection with a URI address, wherein each of the at least one element comprises a start position of the document within the data collection, a length of the document, and a URI of the document;
sorting the data array based on the start positions of each of the at least one element;
executing a URI efficiency function at a position in the word-based wavelet tree; and
providing access to the at least one element of the data array that corresponds to the position in the word-based wavelet tree upon performing said executing step; and
decoding a document from the word-based wavelet tree back into its original representation, said decoding step comprising the steps of:
creating a hash table, wherein a key of the hash table is a pointer value of a node and a corresponding value of the hash table is a rank at the pointer value;
traversing a node for decoding;
consulting the hash table each time a node is traversed;
increasing the rank in the corresponding value of the hash table if the traversed node is indicated in the key of the hash table;
creating a new entry in the key of the hash table for a pointer value of the traversed node if the traversed node is not indicated in the key of the hash table; and
calculating and storing a rank of the pointer value in the value of the hash table corresponding to the new entry in the key of said hash table if the traversed node is not indicated in the key of the hash table.

14. The self-indexing method as claimed in claim 13, further comprising the step of storing uncompressed words on leaf nodes of the wavelet tree.

15. The self-indexing method as claimed in claim 13, further comprising ranking documents within the data collection, said ranking step comprising the steps of:
   sorting query terms comprising a rarest query term and at least one non-rarest query term by occurrence within the data collection;
   counting the rarest query term with term frequency;
   searching for documents including the rarest query term;
   performing a probabilistic check for the non-rarest query terms when a document including the rarest query term is found;
   searching for a first occurrence of each non-rarest query term if the probabilistic check indicates a likelihood of a presence of the non-rarest query terms; and
   performing a probabilistic check for the non-rarest query terms on a next document including the rarest query term if the probabilistic check does not indicate a likelihood of a presence of the non-rarest query terms.

16. The self-indexing method as claimed in claim 13, further comprising the step of assigning a next available end tagged dense code (ETDC) from an ordered list of ETDCs to a previously unseen word.

17. The self-indexing method as claimed in claim 13, further comprising the step of separating stopwords from the data collection, said separating step comprising the steps of:
   assigning an end tagged dense code (ETDC) to each stopword;
   storing the ETDCs assigned to each stopword and the stopwords in a stopword index distinct from the data collection;
   indexing the stopword index; and
   preserving an order of the stopwords in the stopword index.

18. The self-indexing method as claimed in claim 17, wherein said separating stopwards step further comprises the steps of:
   assigning ETDCs to bigrams comprised of stopwords; and
   storing the ETDCs assigned to each bigram and the bigrams in the stopword index.

19. The self-indexing method as claimed in claim 13, further comprising the step of providing multiple fields, said providing step comprising the steps of:
   assigning an end tagged dense code (ETDC) to each field type of the data collection;
   creating a sub-index for each field type;
   replacing a value corresponding to a field type with the ETDC assigned to the field type in said assigning step when the value corresponds to a field type; and
   storing the ETDC in the sub-index for the field type.

20. The self-indexing method as claimed in claim 13, further comprising the step of storing the word-based wavelet tree persistently by using a directory structure with an encoding as a path.

* * * * *

UNITED STATES PATENT AND TRADEMARK OFFICE
CERTIFICATE OF CORRECTION

PATENT NO.        : 8,392,433 B2                              Page 1 of 1
APPLICATION NO.   : 13/086571
DATED             : March 5, 2013
INVENTOR(S)       : Amund Tveit It is certified that error appears in the above-identified patent and that said Letters Patent is hereby corrected as shown below:

On the title page, item (74) Attorney, Agent or Firm should read:

(74)    Catherine Napjus, Michael J. Perssor
        Lawson Persson & Weldon-Francke, PC Signed and Sealed this
Twenty-eighth Day of January, 2014

Michelle K. Lee
*Deputy Director of the United States Patent and Trademark Office*

UNITED STATES PATENT AND TRADEMARK OFFICE
CERTIFICATE OF CORRECTION

PATENT NO. : 8,392,433 B2  
APPLICATION NO. : 13/086571  
DATED : March 5, 2013  
INVENTOR(S) : Amund Tveit Page 1 of 1

It is certified that error appears in the above-identified patent and that said Letters Patent is hereby corrected as shown below:

On the Title Page, insert item (73)

--AtBrox, SA (Trondheim, Norway)--

Signed and Sealed this  
Thirteenth Day of May, 2014

Michelle K. Lee  
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,392,433 B2 | Page 1 of 1 |
| APPLICATION NO. | : 13/086571 | |
| DATED | : March 5, 2013 | |
| INVENTOR(S) | : Amund Tveit | |

It is certified that error appears in the above-identified patent and that said Letters Patent is hereby corrected as shown below:

On the Title Page, "item (76)" should read --item (75)--.

On the Title Page, insert item (73)

--AtBrox, SA (Trondheim, Norway)--.

This certificate supersedes the Certificate of Correction issued May 13, 2014.

Signed and Sealed this
Tenth Day of June, 2014

Michelle K. Lee
*Deputy Director of the United States Patent and Trademark Office*